Figure 1:
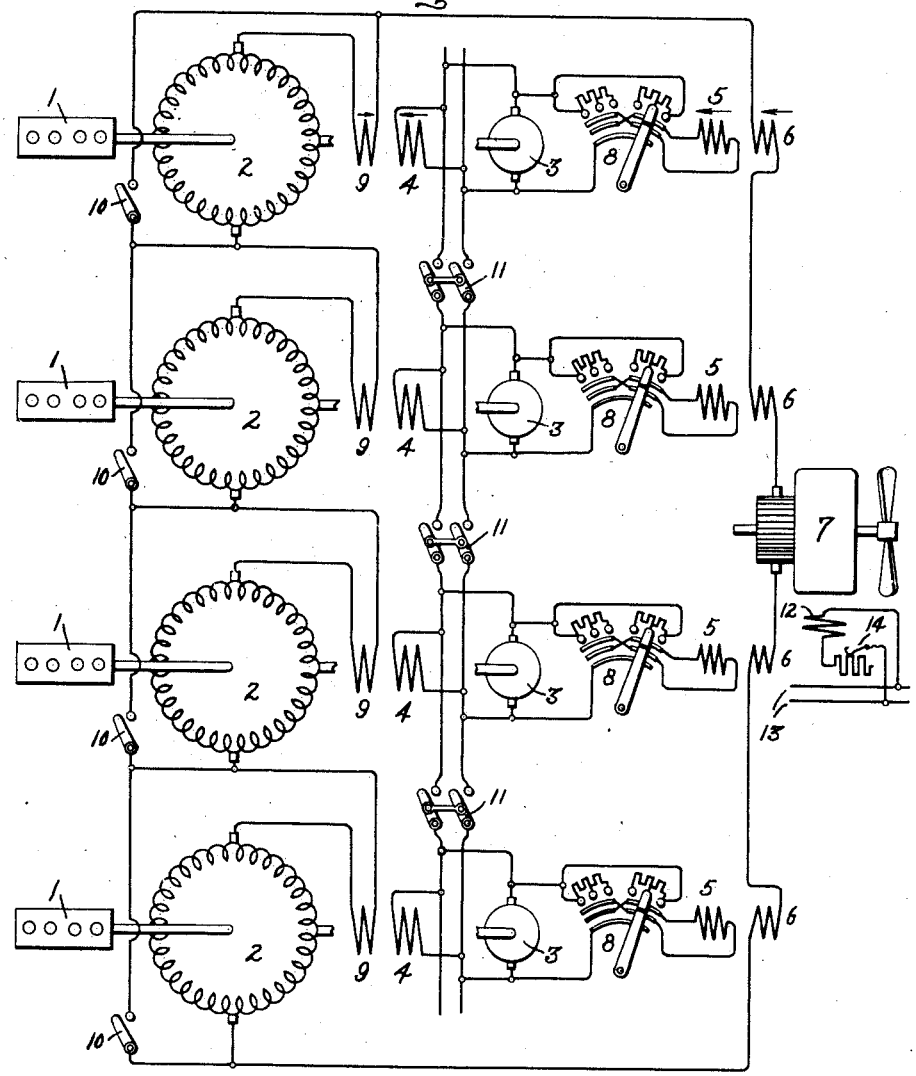

June 11, 1929.  A. A. POLLOCK  1,717,255
SHIP PROPULSION
Original Filed July 17, 1923   2 Sheets-Sheet 2

Inventor:
Alan A. Pollock,
by
His Attorney.

Patented June 11, 1929.

1,717,255

UNITED STATES PATENT OFFICE.

ALAN ADAIR POLLOCK, OF LEAMINGTON SPA, ENGLAND, ASSIGNOR TO GENERAL ELECTRIC COMPANY, A CORPORATION OF NEW YORK.

SHIP PROPULSION.

Application filed July 17, 1923, Serial No. 652,195, and in Great Britain December 2, 1922. Renewed December 20, 1928.

My invention relates to ship propulsion and especially to systems of electric ship propulsion in which the propeller motors are supplied with current from direct current generators driven by Diesel engines or other prime movers subject to variations in speed and driving torque.

In the usual arrangement of such systems the generators are connected in series so as to insure satisfactory division of the propeller load between the different engines which may be running at one time, the number of engines running being varied according to the speed at which it is desired to drive the ship. If there are four engines, for example, each generator may be wound for 200 volts, thus making available a total of 800 volts with the four generators in series. If it is desired to run at approximately three-fourths full speed, the system may be operated at 400 volts with two of the generators idle. Under these conditions the two remaining engines may be run on full load by weakening the field of the motor and thus securing maximum economy. A Ward Leonard control is usually provided for varying the speed of the propeller from full speed in one direction to standstill and full speed in the reverse direction with all the engines running.

For excitation of the main generators and also for lighting and auxiliary appliances on the ship it has been found convenient to provide auxiliary generators, one each in tandem with each main generator and driven by the same engine. These auxiliary generators or exciters are self-excited, the voltage of each varying with the speed of the engine by which it is driven. Any fluctuation in engine speed therefore results in variations of the exciter voltage. These variations are independent of the load on the exciter and cause considerable trouble by burning out lights and otherwise injuring electrical apparatus arranged to be supplied with current from the auxiliary generators. Fluctuations of considerable magnitude tend to occur, for example when the ship is navigating in rough water. In this case the speed of the ship relative to the water varies widely, due to large waves, and, therefore, if the speed of the propeller is maintained constant, the driving torque will vary and may even change from a negative value to twice the normal torque in a positive direction.

In order to reduce these load fluctuations of the engine, the inherent regulating characteristics of the propelling motors and generators in combination may be made drooping by means of a differential series winding on the generators and such characteristic permits a variation in speed of the propeller as the torque varies. It is not desirable, however, to make the drooping characteristic excessive, and the result is that there may still be considerable variation in load on the engine when the ship is in a rough sea.

The object of the present invention is to provide a system wherein approximately constant voltage is maintained on the auxiliary generator.

In one form of the invention the auxiliary generator is fitted with a winding connected in series with the main propelling motor circuit or alternatively it may be excited by the voltage drop across a resistance or shunt in the main circuit. Then as the speed of the engine drops, due to increased load in the main circuit, the excitation of the auxiliary generator is increased and the voltage maintained approximately constant.

In another form of the invention a differential winding is connected in opposition to the self-excited main shunt winding on the auxiliary generator and is excited from the main generator voltage. When the voltage in the propelling circuit decreases, due to excessive load, the voltage on this differential winding is also decreased and the resultant magneto-motive force on the auxiliary generator increased so as to maintain approximately constant voltage. The differential winding may be either connected across the armature of the main generator or alternatively across both the armature and series fields. A still greater field variation may be obtained by connecting one end of the differential winding to an auxiliary or pilot brush placed on the commutator of the main generator at a point between the positive and negative brushes. Due to the effect of armature reaction in distorting the main pole flux as the load comes on, the voltage between the pilot brush and one of the main brushes will vary throughout a wider range for a given variation in load than will the voltage between the main brushes. No extra switches are required in this arrangement because the differential winding may remain continuously in the circuit. It will be observed that in each form of the invention the excitation of the auxiliary generator is controlled in accordance with an electrical condition of the main generator.

As explained in my divisional application, Serial No. 16,755, filed March 19, 1925, in cases where it is convenient to take the excitation of all the generators from one exciting machine, in order to obviate the danger of reversal of the engine by the torque of the generator in the event of failure of one or more cylinders on the engine, two shunt windings may be provided in addition to the differential series winding on the main generators. The main shunt winding is excited from an auxiliary generator which may be driven by another engine to operate at approximately constant voltage and is controlled by Ward Leonard control. The other shunt winding, which acts in the same sense as the main shunt winding, is excited off the terminals of the main generator, and the excitation produced by it therefore varies directly as the voltage of the main generator. In the event of one of the cylinders failing, the engine will immediately slow up with a reduction in voltage of the main generator. This reduction in voltage produces a reduction in field strength which still further reduces the voltage, the result being that the torque generated is reduced sufficiently to enable the engine to drive the generator at a reduced speed even though one or more of the cylinders may be cut out of action.

My invention will be better understood from the following description taken in connection with the accompanying drawings, and its scope will be pointed out in the appended claims.

Figure 2:
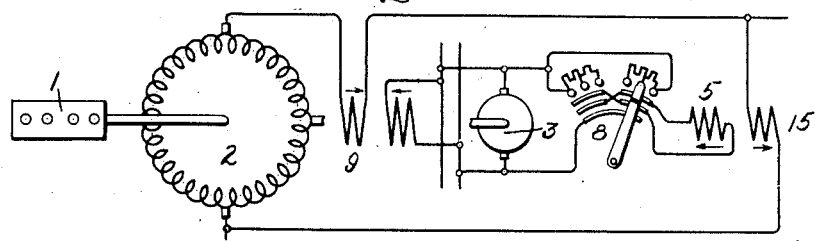

Referring now to the drawing, Fig. 1 shows a system in which the auxiliary generators are each provided with a field winding connected in series with the propeller motor; Fig. 2 shows a part of a similar system in which a field winding of each of the auxiliary generators is connected across the terminals of the corresponding main generator, and Fig. 3 shows a modification in which one terminal of a field winding is connected to a pilot brush on the commutator of the main generator.

Fig. 1 shows a plurality of prime movers 1, each arranged to drive a direct current generator 2. Mounted on the shaft of each generator 2 is an auxiliary generator or exciter 3 arranged to supply current to the shunt field winding 4 of the corresponding generator 2. Each of the exciters 3 is provided with a shunt field winding 5 connected to its terminals and a second field winding 6 connected in series relation with the propeller motor 7. In series with the field winding 5 of each of the exciters 3 is a reversing rheostat 8 provided for controlling the speed and direction of rotation of the propeller motor by variation in the value and sense of the main generator voltage. Each of the main generators 2 is provided with a differential series winding 9 and also with a short-circuiting switch 10 for shunting the generator when it is not in operation. Switches 11 may be provided to permit excitation of a main generator from a non-corresponding exciter if desired. The propeller motor 7 has its field winding 12 interconnected with a source of excitation 13 through a rheostat 14. In the operation of this modification, if the speed of the engines drop, due to increased load, the auxiliary generator voltage is maintained approximately constant by reason of the fact that the excitation is increased in direct proportion to the current of the coils 6 connected in series with the propeller motor.

Figure 3:
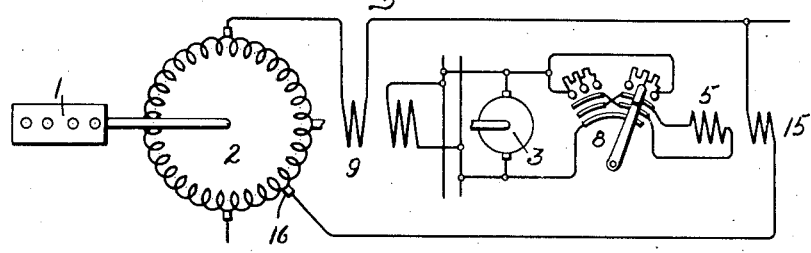

Figs. 2 and 3 show an arrangement in which the auxiliary generators 3 are provided with a differential winding 15 connected in opposition to the self-excited main shunt winding 5, one terminal of this winding being connected to a pilot brush 16 in the modification shown by Fig. 3. In the operation of this arrangement, any decrease in the voltage of the motor circuit due to excessive load produces a corresponding decrease in the voltage and current of the differential winding 15 and the resultant magnetomotive force on the auxiliary generator is increased so as to maintain approximately constant voltage.

What I claim as new, and desire to secure by Letters Patent of the United States, is:

1. A power system comprising a prime mover whose speed varies with load fluctuations, a main generator and an auxiliary generator driven by said prime mover, and means for exciting said auxiliary generator comprising an exciting winding and a winding whose excitation is responsive to an electrical condition varying with the load of said main generator and which acts in conjunction with the exciting winding to control the total excitation of said auxiliary generator to maintain an approximately constant voltage on said auxiliary generator upon variations of load producing speed variations of the prime mover and said generators.

2. A system comprising a main electrical machine whose speed varies with its load, an auxiliary generator mechanically connected to said main electrical machine, and means for exciting said auxiliary generator comprising an exciting winding and an auxiliary winding whose excitation is responsive to an electrical condition varying with the load of said main electrical machine and which acts in conjunction with said exciting winding to maintain an approximately constant voltage on said auxiliary generator irrespectively of speed variations occasioned by said main electrical machine.

3. A ship propulsion system comprising a prime mover whose speed varies with its load, a main generator and an auxiliary generator driven by said prime mover, a propeller motor electrically connected with said main generator, and means for exciting said auxiliary generator comprising an exciting winding and a winding whose excitation is responsive to an electrical condition of said main generator and which acts in conjunction with said exciting winding to control the total excitation of said auxiliary generator and maintain an approximately constant voltage on the auxiliary generator upon a variation of load on the system producing a variation in speed of the prime mover and said generators.

4. A system of electric ship propulsion comprising a prime mover whose speed varies with its load, a main generator and an auxiliary generator driven by said prime mover, a propeller motor electrically connected with and driven by said main generator, and means for exciting said auxiliary generator comprising a self excited winding and a winding connected in the electrical circuit between said main generator and said motor whose excitation is controlled in response to current variations in said circuit and which acts in conjunction with the self exciting winding to control the total excitation of said auxiliary generator and maintain an approximately constant voltage on said auxiliary generator upon a variation of load on the system producing a variation in speed of the prime mover and said auxiliary generator.

5. A system of electric ship propulsion comprising a prime mover subject to variations in speed and load, a main generator and an auxiliary generator mechanically connected to said prime mover, means for exciting said auxiliary generator comprising an exciting winding and a second winding whose excitation is responsive to an electrical condition varying with the speed and load of said main generator and which acts in conjunction with the exciting winding to control the excitation of the auxiliary generator upon a variation in speed and load of the prime mover to maintain an approximately constant voltage on said auxiliary generator.

In witness whereof, I have hereunto set my hand this twenty-sixth day of June, 1923.

ALAN ADAIR POLLOCK.